S. W. PUTNAM, 3D.
JOURNAL BUSHING.
APPLICATION FILED NOV. 25, 1918.
1,328,195.
Patented Jan. 13, 1920.
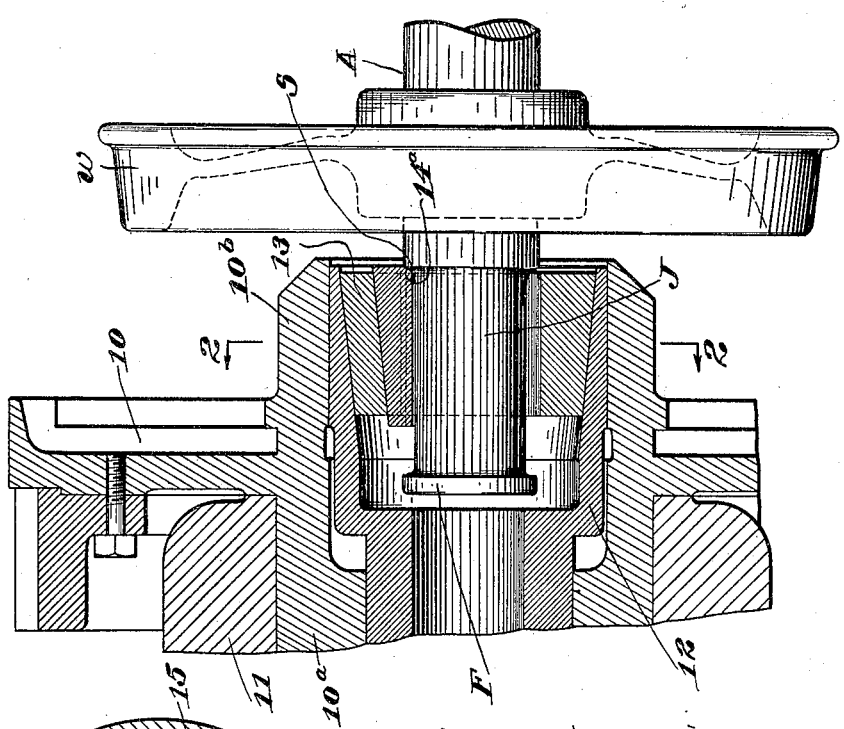
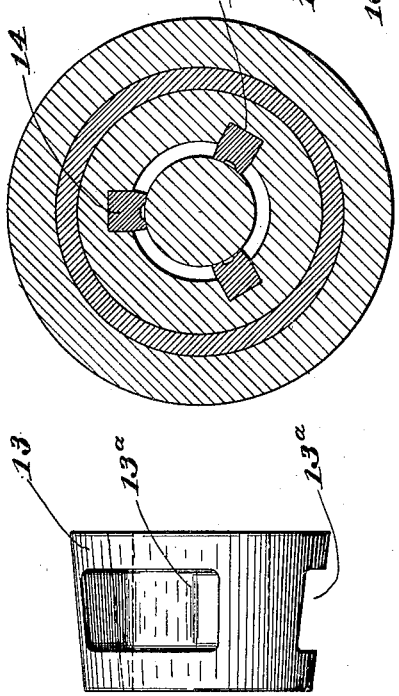
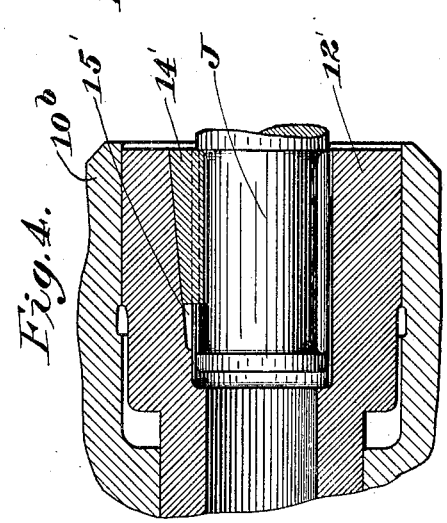
Inventor
Salmon W. Putnam 3rd
by Clyde L. Rogers
his Attorney.

UNITED STATES PATENT OFFICE.

SALMON W. PUTNAM, 3D, OF ROCHESTER, NEW YORK, ASSIGNOR TO ARTHUR H. INGLE, OF ROCHESTER, NEW YORK.

JOURNAL-BUSHING.

1,328,195.  Specification of Letters Patent.  Patented Jan. 13, 1920.

Application filed November 25, 1918. Serial No. 264,075.

*To all whom it may concern:*

Be it known that I, SALMON W. PUTNAM, 3d, a citizen of the United States, and resident of Rochester, county of Monroe, State of New York, have invented an Improvement in Journal-Bushings, of which the following description, in connection with the accompanying drawings, is a specification, like characters on the drawings representing like parts in each of the several views.

This invention relates to bushings for centering and holding journals in tire turning lathes, such as the various types of double open center and also center drive lathes. It is not practicable to mount the axles of car wheels, the tires of which are to be turned, between the usual lathe centers for the reason that the axle journal projects for so great a distance beyond the tire of the wheels that a prohibitive overhang exists between the point of suspension of the axle and the point of applied load, *i. e.*, the cutting tool on the tire, which would result in excessive vibration due to the springing of the axle. To provide means for centering and rigidly supporting the axle journal up relatively close to the wheel, it has heretofore been customary to provide a bushing with tapered exterior which is first turned as a solid ring and of a size to fit within a suitable taper socket, and then such ring is sawed open to produce usually three segments. Since it is requisite that the bushing be adapted to engage and center not only a journal of a particular diameter, but also such journal after it has become smaller by wear or may have been turned down to a smaller size, it has been customary to saw the bushing open with a saw of substantial thickness, *i. e.*, of one-quarter inch or upward so that by the clearance thus obtained the bushing segments are permitted to contract to a smaller diameter than the original bore without the ends of the sectors coming together. It is obvious that with the bushing thus contracted the sectors thereof would not fit accurately either the taper socket or the axle journal, since they would engage at their ends only against the taper socket, and at their central portions only against the journal. Thus it would result that the journal would not be rigidly held and under the very severe tool pressure characteristic of this class of work, the sectors would not be constrained to stay in any one position but would be likely to move or float about which has been a condition often observed in practice and causing the lathe to hammer and pound violently when turning some wheels, while being relatively steady in operation on others.

The principal object of the present invention is to provide means for automatically centering the axle with respect to the lathe spindle and rigidly supporting the axle journal, that is also automatically adjustable to clamp and hold securely axle journals within a range capable of taking care of all variations likely to be encountered in practice. To this end I provide a bushing adapted to fit the usual tapered socket that is formed to constitute a cage or holder for a series of spaced apart inserted clamping and centering members which are preferably fitted in lengthwise tapered slots of such bushing cage and are adapted to be engaged by the shoulder at the inner end of the axle journal to press the same endwise into centering and clamping position. The foregoing and other objects and advantages of the invention will more fully appear from the following detailed description, and the distinctive features of novelty will be pointed out in the appended claims.

Referring to the drawings:

Figure 1 is a partial longitudinal section showing a part of the face plate of a tire turning lathe equipped with my improved journal bushings and with an axle journal entered therein;

Fig. 2 is a transverse section on line 2—2 of Fig. 1;

Fig. 3 is an elevation showing the bushing cage removed; and

Fig. 4 is a partial longitudinal section showing a modified form.

10 indicates the usual face plate of a tire turning lathe, a rearwardly extending sleeve 10$^a$ of which is journaled in a suitable bearing support 11. This face plate has as usual a short forwardly extending sleeve 10ᵇ in which is fitted a usual taper socket 12. In accordance with my invention I produce a one-piece bushing ring 13 with its exterior tapered to fit the taper of the socket 12. This bushing ring is constituted as a cage for holding centering and clamping inserts or jaws 14 which are slidingly fitted in grooves 15 formed in the interior of the bushing ring and with their outer surfaces obliquely disposed with respect to the axis of the cage. While the invention is not limited as to a particular number of the inserts or jaws 14, I preferably, and as shown employ three of these as a set, this being the minimum number adapted to properly center and clamp the journal. The inner edges of these inserts or jaws extend in parallelism with the cage axis so that they are adapted to center accurately and clamp an axle journal J which projects outward from the wheel W on the axle A. In use the bushing cage 13 is slipped with the larger end first over the flange F on the end of the journal and when partly over the flange the insert jaws 14 are placed in the grooves and the whole moved inward until the ends of the inserts bear against the shoulder S at the inner end of the journal. The ends of the inserts or jaws are preferably curved and formed as indicated at 14ᵃ so as to fit the usual curve at this shoulder. The device is now ready to be placed in the lathe and as the tapered bushing 13 reaches its seat in the tapered socket, the further relative endwise movement between the parts will cause the insert jaws 14 to move endwise and inward centering and producing an absolutely true bearing both of the cage in the tapered socket and of the journal in the cage, and this condition will exist regardless of variations in the diameter of the journal J within a substantial range and so far as required in practice, the insert jaws merely requiring to be slid endwise a greater or less extent before they center on and clamp the journal, and this being obtained merely by relatively endwise adjustment of the tapered bushing with respect to the axle. It is of course to be understood that in this class of work the described centering bushing is employed in duplicate for centering and holding the two journals at the ends of the axle. It will be seen to be requisite that the bore through the bushing cage 13 should be large enough to permit the passage of the outer journal flange F through the bushing for the assemblage described. The bushing cage may be cored out as indicated at 13ᵃ in parts of the periphery thereof to reduce its mass and improve the bearing contact. In Fig. 4 I show a modification wherein the tapered socket 12′ associated with the face plate and fitted in the sleeve 10ᵇ thereof has insert jaws 14′ fitted directly in oblique grooves 15′ thereof, thus dispensing with the use of a separate bushing cage. In this case any suitable means (not shown) would be employed for preliminarily holding and spacing the insert jaws on the axle journal as it is fitted in place. It will be understood that since the insert jaws are removable, the range of adaptability of the device may be enlarged by providing other sets of insert jaws designed for centering larger or smaller sizes of journals,—i. e., preferably each set of insert jaws is intended and designed to take care of a specific size of journal at its normal diameter and with such reduction in diameter as is apt to result from wear or usual turning down thereof, the use of any particular set of insert jaws being therefore entirely selective and optional to meet particular requirements. I am aware that the invention may be embodied in other specific forms without departing from the spirit or essential attributes thereof, and I therefore desire the present embodiment to be considered in all respects as illustrative and not restrictive reference being had to the appended claims rather than to the foregoing description to indicate the scope of the invention.

Having described my invention, what I claim as new and desire to secure by Letters Patent is:

1. The combination with a driving sleeve comprising a tapered socket, and a journal holding chuck adapted to be fitted therein and equipped with a bushing, said chuck comprising an externally tapered ring cage having spaced apart grooves in the interior thereof lying in radial planes with the bottoms thereof oblique with reference to the axis of the cage, and removable insert jaws fitted in said grooves and adapted to center and clamp an axle journal between them.

2. The combination with a tapered socket constituting a driving element, of a one-piece bushing cage externally tapered to fit the same and provided with grooves in its interior, said grooves lying in radial planes and having bottoms oblique to the axis of the cage, and a set of tapered insert jaws removably fitted to said grooves and adapted to center and clamp between them an axle journal or the like.

3. A journal holding chuck comprising a one-piece ring externally formed to be fitted into driving relation with a driving socket, said ring having a series of spaced apart grooves in its interior lying in radial planes and having bottoms oblique to the axis of the ring, and a set of tapered, insert jaws removably fitted to said grooves and adapted to center and clamp between them an axle journal.

4. A journal holding chuck equipped with a bushing, comprising a one-piece bushing cage externally tapered to fit a tapered driving socket and having spaced apart grooves extending lengthwise of its interior lying in radial planes and having bottoms oblique to the axis of the ring, and a set of insert jaws removably fitted in said grooves, said jaws formed at their inner ends to fit the shoulder at the inner end of an axle journal whereby they may be simultaneously pressed endwise by such shoulder to cause them to center and clamp between them the axle journal.

In testimony whereof, I have signed my name to this specification.

SALMON W. PUTNAM, 3D.